(No Model.)

W. HARRISON.
NUT LOCK.

No. 565,077. Patented Aug. 4, 1896.

Witnesses
Herbert Dunn
Jabez Bullus

Inventor
Wm Harrison

UNITED STATES PATENT OFFICE.

WILLIAM HARRISON, OF HORSFORTH, ENGLAND.

NUT-LOCK.

SPECIFICATION forming part of Letters Patent No. 565,077, dated August 4, 1896.

Application filed July 18, 1895. Serial No. 556,332. (No model.) Patented in England March 8, 1892, No. 4,535.

*To all whom it may concern:*

Be it known that I, WILLIAM HARRISON, a subject of the Queen of Great Britain, residing at Horsforth, in the county of York, England, have invented new and useful Improvements in or Connected with Nut-Locks, (for which I have obtained a patent in Great Britain, No. 4,535, dated March 8, 1892,) of which the following is a specification.

My invention has reference to certain improvements in or connected with nut-locks.

The object of my invention is to provide a simple and efficient nut-lock. For this purpose I employ a washer having projections upon its under surface, adapted to fit into the wood surface, or into recesses or notches upon the metal surface, through which the bolt protrudes, and lock itself thereon, and recesses upon its top surface into which fit projections upon a second washer or metal disk which is so locked upon the first washer and made so that a portion of its edge can be turned up by any suitable means against the square or flat surface of the nut when tightened, and thereby lock the nut upon the bolt.

Figure 1:
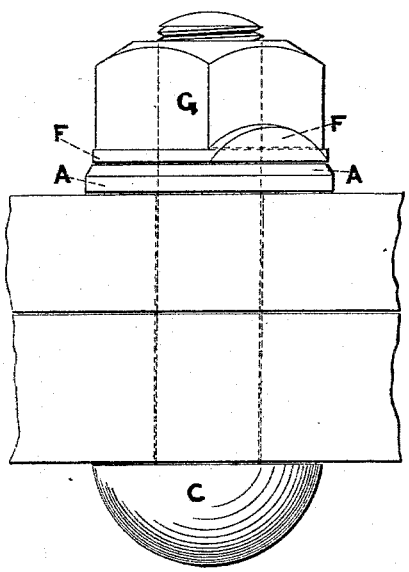
Figure 3:
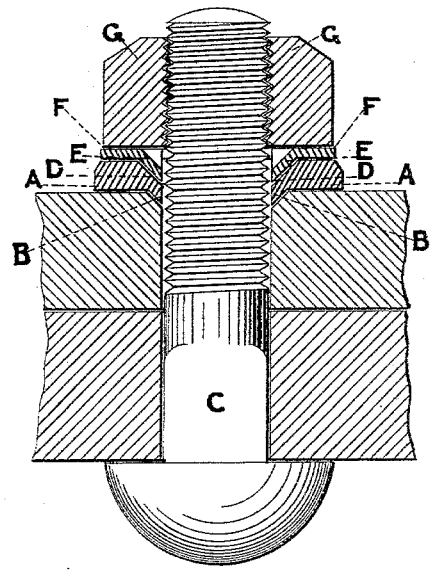
Figure 2:
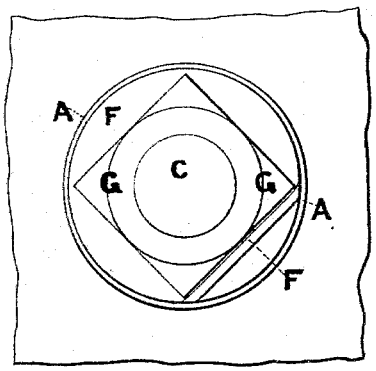
Figure 4:
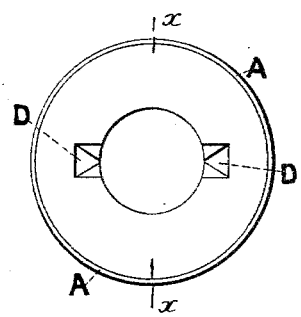
Figure 5:
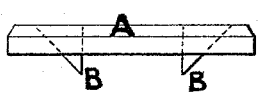
Figure 6:
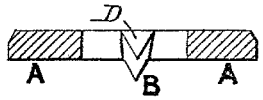

In the drawings, Figure 1 is an elevation of nut-lock in accordance with my improvements. Fig. 2 is a plan of Fig. 1. Fig. 3 is a sectional elevation of nut-lock as shown in Figs. 1 and 2. Fig. 4 is a plan of washer locking into the wood or metal surface through which the bolt protrudes. Fig. 5 is a side elevation of Fig. 4. Fig. 6 is a section through Fig. 4, taken on line $x\ x$.

According to my invention I employ a washer A, having projections B upon its under surface, adapted to fit into the wood surface by pressure, or into recesses or notches, formed by filing or notching out such upon the metal surface through which the bolt C protrudes, and lock itself thereon, and recesses D upon its top surface into which fit projections E upon a second washer or metal disk F, which is so locked upon the first washer, and made of copper, steel, or other suitable material, so that a portion of its edge can be turned up by any suitable means, such as a chisel, against the square or flat surface of the nut G when tightened, and thereby lock the nut G upon the bolt C.

When it is required to remove the nut or slacken it, the turned-up portion of the edge as aforesaid is turned down again, allowing the nut to be slackened or removed as required.

What I claim as my invention, and desire to secure by Letters Patent, is—

1. In a nut-lock, the combination, with a bolt and its nut, of a washer provided with projections B on its under side and corresponding recesses D above the said projections, and a washer F of flexible metal provided with projections E fitting into the recesses D and having a flange F for engaging with the said nut when its edge is bent upward, substantially as set forth.

2. A nut-lock or washer formed of two parts one rigid and the other of bendable metal each said part being provided with diametrically opposite slots adjacent to the bolt-opening and prongs or projections extending from the slots, substantially as set forth.

W. HARRISON.

Witnesses:
 HERBERT DUNN,
 JABEZ BULLUS.